C. M. L. MOSESON.
FRICTION CLUTCH.
APPLICATION FILED MAR. 23, 1910.

1,008,428.

Patented Nov. 14, 1911.

Witnesses
R. D. Tolman
Penelope Comberbach

Inventor
Charles M. L. Moseson.
By Rufus B. Fowler
Attorney

UNITED STATES PATENT OFFICE.

CHARLES M. L. MOSESON, OF FITCHBURG, MASSACHUSETTS.

FRICTION-CLUTCH.

1,008,428.  Specification of Letters Patent.  Patented Nov. 14, 1911.

Application filed March 23, 1910. Serial No. 551,223.

*To all whom it may concern:*

Be it known that I, CHARLES M. L. MOSESON, a citizen of the United States, residing at Fitchburg, in the county of Worcester and Commonwealth of Massachusetts, have invented a new and useful Improvement in Friction-Clutches, of which the following is a specification, accompanied by drawings forming a part of the same.

My invention relates to a clutch mechanism comprising a driving and a driven member in which the connection is made by the wedging action of balls or rollers between opposing surfaces on the driving and driven members, and it consists in the embodiment of certain novel features of construction which are hereinafter described and pointed out in the annexed claims and illustrated in the accompanying drawings, in which—

Figure 1:
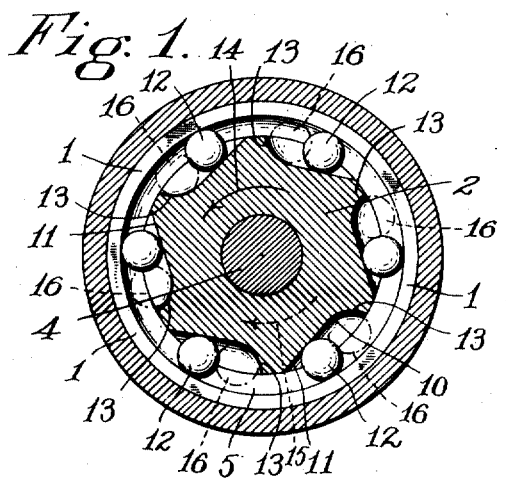
Figure 2:
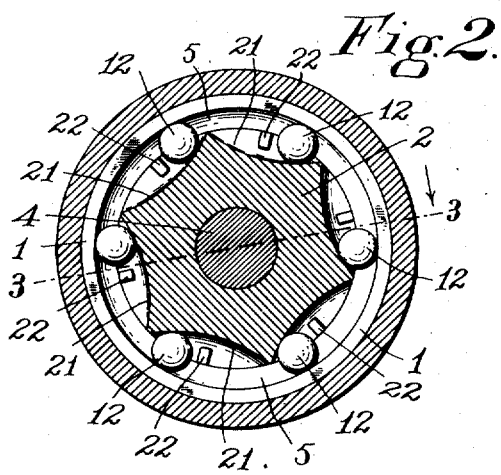
Figure 3:
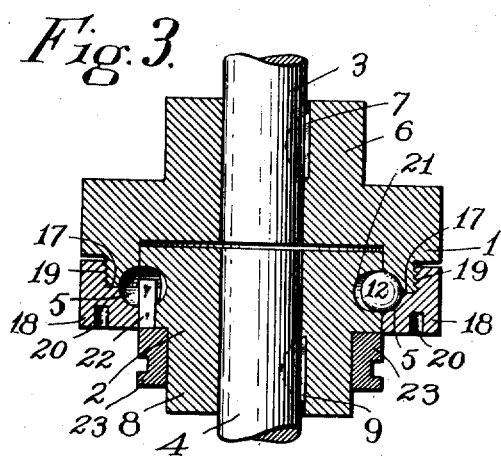
Figure 4:
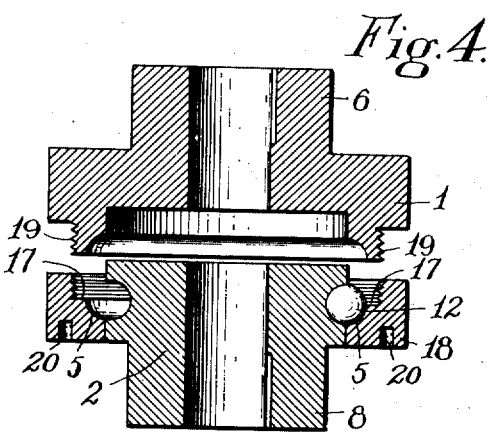

Figure 1 is a transverse sectional view of a friction clutch embodying my invention, the section being taken through the center of the ball race. The construction shown in Fig. 1 forms a friction clutch in which the driven member is adapted to be rotated in one direction only. Fig. 2 is a transverse section of a clutch embodying my invention, in which the driven member is adapted to be rotated in either one of two directions. Fig. 3 is a longitudinal sectional view on the line 3—3, Fig. 2 with the driving and driven members of the clutch represented as attached to the ends of independent shafts, and showing the construction shown in Fig. 2, and Fig. 4 is a central longitudinal sectional view of the two members of the clutch separated for the insertion of balls, and showing the construction represented in Fig. 1.

Similar reference characters refer to similar parts in the different figures.

Referring to the accompanying drawings, 1 and 2 denote the two members of the clutch, either one of which may constitute the driving member and the other the driven member. The member 1 is represented as being keyed, or otherwise attached, to a shaft 3 and the member 2 is similarly attached to a shaft 4. If the shaft 3 is rotated, its motion will be communicated through the members of the clutch to the shaft 4 and, likewise, if the shaft 4 is rotated, its movement will be communicated to the shaft 3. The clutch member 1 comprises an outer annular member having an annular internal groove 5, which is semicircular in its cross section. The annular outer member, in the present instance, is provided with a hub 6 which is attached by a key 7 to the shaft 3. Inclosed within the annular member 1 is the inner member 2, in the present instance provided with a hub 8 attached by a key 9 to the shaft 4. The inner member 2 is provided on its periphery with a series of ball recesses 10, each recess having a cam surface 11.

In each of the recesses 10 is inserted a ball 12, capable of a slight rolling movement over the cam surface 11. The rolling movement of the ball 12 over the cam surface 11 is limited in one direction by the wedging of the ball between the cam surface 11 and the bottom of the groove 5, while the motion of the balls in the opposite direction is limited by the walls 13 forming the ends of the recesses. For example, if the member be rotated in the direction of the arrow 14, the balls will be moved into the position shown at 12, causing them to be wedged tightly between the cam surface 11 and the bottom of the annular groove 5. If the member 2 be rotated in the direction of the arrow, 15 the balls will roll into the positions indicated by the broken lines 16 and against the end walls 13 of the ball recesses, thereby disconnecting the two members 1 and 2.

The outer annular member 1 is divided at 17, or at the center of the annular groove 5, to form a removable ring 18, the two sections of the outer annular member being held together by a screw threaded connection 19. The side of the removable ring 18 is provided with spanner holes 20 for convenience in removing it.

In Fig. 2 the interior member 2 is provided with ball recesses 21 divided into two equal sections by sliding fingers 22, which serve as stops to limit the movement of the balls in one direction. When power is to be transmitted through the clutch members in one direction, the balls 12 are placed on one side of the fingers 22, but when the rotative movement is to be imparted in the opposite direction, the fingers are withdrawn by means of a sliding collar 23 to which the fingers are attached and the balls move to the opposite ends of the recesses, when the fingers 22 are again inserted.

In order to insert the balls between the two members of the clutch, the inner member 2 is removed from the outer member, and the ring 18 is removed from the outer member and is placed over the inner member with the balls 12 inserted between them, as shown in Fig. 4. The inner member is then inserted in the outer member and at the same time the ring 18 is screwed into place, thereby maintaining the position of the balls in the ball recesses.

I claim,

1. A friction clutch, comprising an interior member having peripheral recesses for rolling bodies, said recesses having cam surfaces, an exterior member having an annular internal groove, a series of rolling bodies held between said recesses and said groove, said exterior member divided to form a removable ring containing part of said internal groove.

2. A friction clutch, comprising two members, each arranged to be attached to shafts of the same diameter, with one of said members provided with a flange arranged to inclose an inner portion of the other member, said flange provided with an annular internal groove, with said inner portion having peripheral recesses to receive rolling bodies, said recesses having cam surfaces, rolling bodies held between said recesses and said groove, with said flange divided to allow of the insertion of said rolling bodies, and means for detachably attaching the parts of said flange.

3. In a friction clutch of the class described, an exterior member having an interior groove semicircular in cross section and divisible on the plane of the center of said groove, with the parts of said member provided with a screw threaded connection, and an interior member removable from said exterior member in a line parallel with its axis.

4. In a friction clutch of the class described, an exterior member having an interior groove semicircular in cross section and separable on the plane of the center of said groove, an interior member having recesses for rolling bodies and removable from said exterior member in a line parallel with its axis.

5. A friction clutch, comprising an exterior member having an annular internal groove, an interior member having peripheral recesses to receive rolling bodies, said recesses having cam surfaces, rolling bodies held between said recesses and said groove, with said exterior member divided to allow of the insertion of said rolling bodies, and means for detachably attaching the divisions of said exterior member.

CHARLES M. L. MOSESON.

Witnesses:
PENELOPE COMBERBACH,
NELLIE WHALEN.